United States Patent

Matsunuma et al.

Patent Number: 5,358,797
Date of Patent: Oct. 25, 1994

[54] ADJUSTING SHIM

[75] Inventors: Kenji Matsunuma; Takao Nishioka; Takehisa Yamamoto; Akira Yamakawa, all of Itami, Japan

[73] Assignee: Sumitomo Electric Industries, Ltd., Japan

[21] Appl. No.: 911,914

[22] Filed: Jul. 10, 1992

[51] Int. Cl.$^5$ ................................ F01L 1/14
[52] U.S. Cl. .................... 428/698; 428/446; 428/336; 428/701; 428/702; 501/97; 123/81 R; 416/219 R; 416/220 R
[58] Field of Search .......... 416/219 R, 220 R; 123/81 R; 428/698, 701, 702, 336, 446; 501/97

[56] References Cited

U.S. PATENT DOCUMENTS

| | | | |
|---|---|---|---|
| 3,811,928 | 5/1974 | Henney et al. | 106/69 |
| 4,400,427 | 8/1983 | Moschetti et al. | 428/446 |
| 4,522,453 | 6/1985 | Lammer et al. | 428/698 |
| 4,806,510 | 2/1989 | Kanai et al. | 501/98 |
| 4,892,848 | 1/1990 | Yoshida et al. | 501/97 |
| 4,896,635 | 1/1990 | Willermet et al. | 123/90.36 |
| 4,966,108 | 10/1990 | Bentz et al. | 123/90.61 |
| 5,052,352 | 10/1991 | Taniguchi et al. | 123/96.39 |
| 5,097,807 | 3/1992 | Oikawa et al. | 123/276 |

FOREIGN PATENT DOCUMENTS 156106  10/1987  Japan .................. F01L 1/20

Primary Examiner—Archene Turner
Attorney, Agent, or Firm—Jordan B. Bierman

[57] ABSTRACT

The present invention provides an improved adjusting shim used in a valve train for an internal combustion engine for an automobile. The adjusting shim produced from a base material consisting of a ceramic material containing 80 to 98 wt. % of silicon nitride and/or sialon and has a porosity of not more than 3%, a bending strength of not less than 1.0 GPa and an impact compressive elastic limit (Hugoniot elastic limit) of not less than 15 GPa, wherein the base material is provided on the surface thereof which contacts a cam with a ceramic surface layer having a composition different from that of the base material and a hardness lower than that of the base material. The adjusting shim of the present invention enables a power loss of a valve train to be minimized; the abrasion resistance thereof to be improved; and the fuel economy, the performance and durability of an internal combustion engine to be improved.

1 Claim, 3 Drawing Sheets

ADJUSTING SHIM

BACKGROUND OF THE INVENTION

1. Field of the Invention

This invention relates to an adjusting shim used in a valve train in an internal combustion engine for an automobile.

2. Description of the Prior Art

A valve train in an internal combustion engine for an automobile is roughly constructed as shown in FIG. 1. Referring to FIG. 1, a reference numeral 1 denotes a cylinder head, 2 a cam, 3 a valve lifter, 4 an adjusting shim, 5 an intake and exhaust valve, 6 a valve seat, and 7 a valve spring. The valve lifter 3 is driven by the cam 2, and the displacement of the cam 2 is transmitted to the intake and exhaust valve 5. As may be understood from FIG. 1, the adjusting shim 4 is disposed between the valve lifter 3 and cam 2. This adjusting shim 4 is used to regulate a valve clearance. The adjusting shim 4 is usually formed out of a metal, and an adjusting shim formed out of a ceramic material so as to reduce the weight and improve the wear resistance is also available.

However, when an engine is provided with an adjusting shim consisting of a ceramic material, which is a brittle material, it is, for example, shifted down suddenly while the vehicle travels at high speed, so that the number of revolutions of the engine increases to exceed an allowable level, abnormal actions of a valve train, such as surging and jumping occur. In such a case, a high impact stress is imparted to the adjusting shim, so that the adjusting shim is broken. This causes the engine to be broken.

Further, a weight-reduced ceramic adjusting shim is used with a view to improving the practical power loss. However, since an adjusting shim accounts for a very small percentage of the inertial weight of a valve train, the weight reduction of a ceramic adjusting shim does not substantially bring about the improvement of a practical power loss.

Moreover, a ceramic material has an increased abrading power with respect to a cam 2 because of a large difference between the harnesses of the ceramic material and a cam. In some cases, the cam is worn greatly, and the weight reduction provides an adverse effect.

SUMMARY OF THE INVENTION

The present invention has been developed with a view to solving these problems, and provides an adjusting shim produced from a base material consisting of a ceramic material which contains 80 to 98 wt. % of silicon nitride and/or sialon. The ceramic material constituting the base material has a porosity of not less than 3%, a bending strength of not less than 1.0 GPa and an impact compressive elastic limit (Hugoniot-elastic limit) of not less than 15 GPa. A ceramic surface layer which has a composition different from that of the ceramic base material of the adjusting shim and a hardness lower than that of the base material is provided on the surface of the base material to be brought into contact with a cam.

In order to eliminate the problems occurring due to the friction between the shim and cam, the ceramic material constituting the surface layer preferably contains silicon (Si) and oxygen (O) and the thickness of the surface layer is preferably not more than 50 μm. Further, it is preferable that the surface roughness of the base material on which the ceramic surface layer has not yet been provided is not more than 0.2 μm in ten-point average roughness.

DETAILED DESCRIPTION OF THE PREFERRED EMBODIMENTS

Figure 1:
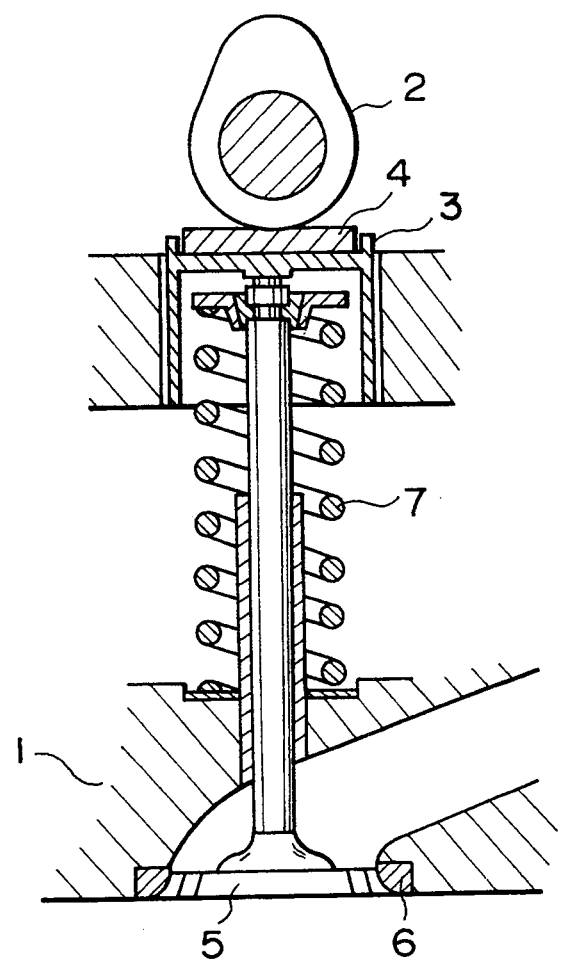
FIG. 1 is a longitudinal section of a valve train for an engine.

The ceramic material constituting the base material for the adjusting shim in the present invention contains, as a main phase, silicon nitride and/or sialon, and it is important that the content of the silicon nitride and/or sialon be not less than 80 wt. % and not more than 98 wt. %. If this content is less than 80 wt. %, the ceramic material necessarily has an increased grain boundary phase, so that the strength of the shim lowers. Consequently, when abnormal actions of a valve train occur, the adjusting shim is broken. When the content exceeds 98 wt. %, the sinterability of the ceramic material lowers, and unless a hot pressing method is used, a sintered body having many pores is produced. This causes the strength of a shim to decrease, so that, when abnormal actions of a valve train occur, the adjusting shim is broken.

In the ceramic material constituting the base material of the adjusting shim, sintering additives, such as $Y_2O_3$, $Al_2O_3$, MgO, etc., can be added in an amount of 2 to 20 wt. % in their total.

With respect to the porosity of the sintered body as the base material, when exceeds 3%, the strength thereof lowers, and, when abnormal actions of a valve train occur, the adjusting shim is broken.

When abnormal actions of a valve train in which the bending strength of the ceramic material constituting the base material of the adjusting shim provided therein is lower than 1.0 GPa occur, the adjusting shim is broken. Accordingly, it is necessary that the ceramic material constituting the base material have a bending strength of not lower than 1.0 GPa, and preferably not lower than 1.2 GPa for securing the reliability of the shim.

The impact resistance of a ceramic material required as a material for producing an adjusting shim has been investigated. The results of the detailed investigation showed that the results of evaluation of a ceramic material which were obtained by using known impact test methods (Charpy impact test method, Izod impact test method and drop-hammer impact test method) and that of evaluation of the same material constituting an adjusting shim in a practical valve train in abnormal actions do not necessarily agree with one another. Various evaluation methods for impact characteristics of the ceramic material were studied and, as a result, it has been found that an adjusting shim consisting of a ceramic material having an impact compressive elastic limit (Hugoniot-elastic limit) of less than 15 Gpa was broken by abnormal actions of the valve train. Therefore, it is necessary that the impact compressive elastic limit (Hugoniot-elastic limit) of the ceramic material constituting the adjusting shim be not less than 15 GPa.

On the other hand, a power loss in the valve train is ascribed partly to the weight of the adjusting shim but mainly to coarseness of the contact or sliding surfaces of the shim and cam, or to the localized uneven contact at a sliding portion due to the scatter of the processing and assembling precision of both of these two parts or to the friction due to the localized uneven contact, etc.

However, in the present invention, a surface layer is provided on the surface of the shim which a cam contacts wears moderately in an initial period of sliding of the surface layer, and the compatibility of the cam and shim with each other is improved, so that uneven contact and localized wear at the sliding portion are eliminated. This enables the power loss to be lessened, and the abrading power of the ceramic adjusting shim with respect to the cam to be reduced for the same reasons, so that wear and durability of the two parts are improved. The surface layer to be brought into contact with a cam consists of a ceramic material containing at least silicon and oxygen and should be formed with a composition different from that of the ceramic material constituting the base material by coating, ion-plating, vapor deposition, heat treatments or other known processes. Further, it is necessary that the surface layer have a hardness and a Young's modulus both lower than those of the base material for the adjusting shim, and it is preferable that a coefficient of friction with respect to the material for the cam be equal to or lower than that of the base material. In order to meet such requirements, it is preferable that the surface layer contain silicon and oxygen. It has been experimentally confirmed that such a surface layer is effective to minimize torque loss.

It is preferable that the surface roughness of the ceramic material as the base material of the adjusting shim on which a surface layer has not yet been provided be not more than 0.2 $\mu$m in ten-point average roughness. This surface roughness greatly affects the compatibility of the shim with respect to a cam in an initial period of sliding movement thereof. When the surface roughness is larger than 0.2 $\mu$m in ten-point average roughness, the abrading power of the shim with respect to the cam increases in accordance with an increase in the surface roughness thereof, and, thereby, the sliding surface of the cams is considerably abraded and roughened. It has been found that such wear and roughening are apt to cause the torque loss to increase and also the durability of the cam to decrease.

Further, it is preferable that the thickness of the surface layer be not more than 50 $\mu$m.

Even when the thickness of the surface layer is varied, the variation of the effect in reducing a power loss and the abrading power of the shim with respect to the cam is not recognized. When unduly large stress is imparted to the adjusting shim due to an abnormal operation or the like to cause the surface layer to fall, there is the possibility that the dropped broken pieces of the surface layer hurt other parts. Accordingly, it is preferable that the thickness of the surface layer be reduced so as to minimize the sizes of the dropped broken pieces thereof in view of the prevention of the damage due to the dropped broken pieces. Further, a thick surface layer is unfavorable in view of the productivity of the shim.

The present invention will now be described concretely on the basis of its embodiments.

EXAMPLE 1

Figure 2:
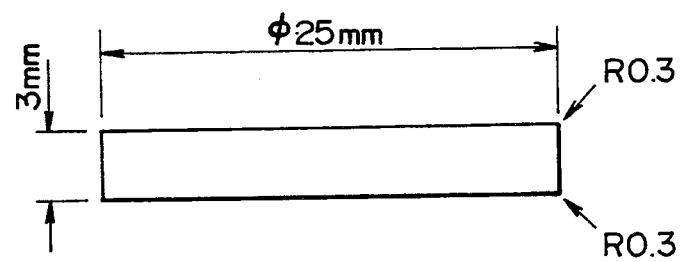
FIG. 2 is a drawing showing the shape of an adjusting shim.

92 wt. % of commercially available silicon nitride powder (having an alphatizing percentage of 95 wt. % and an average particle size of 0.5 $\mu$m) were wet-mixed with 5 wt. % yttrium oxide powder, 2 wt. % aluminum oxide powder and 1 wt. % magnesium oxide powder, all sintering additives, in ethanol in a nylon ball mill for 100 hours, and the slurry thus obtained was passed through 20 $\mu$m nylon meshes. The resultant product was dried at 90° C. for 20 hours, and a dried product thus obtained was passed through 250 $\mu$m nylon meshes. The powder thus obtained was molded by CIP (cold isostatic pressing) under a pressure of 3000 kgf/cm$^2$. The resultant molded body was sintered under various sintering conditions, and 25 mm×3 mm disc type test pieces as shown in FIG. 2 were cut out from the sintered bodies thus obtained. The upper and lower surfaces of each test piece were finished with a #800 diamond wheel, and the circumferential portions thereof were chamfered with R 0.3 to form a base material for an adjusting shim. 15 bending test specimens in conformity with JIS R 1601 were cut out from each of the above-mentioned sintered bodies, and subjected to the measurement of 3-point bending strength. Alternatively, 19 mm×19 mm×5 mm test specimens were cut out from the same sintered bodies so as to be used for measuring the impact compressive elastic limit (Hugoniot-elastic limit) thereof, and then subjected at their upper and lower surfaces to a finishing process using a #800 diamond wheel and to the measurement of the impact compressive elastic limit (Hugoniot-elastic limit) by an inclined mirror method illustrated in FIG. 3.

Figure 3:
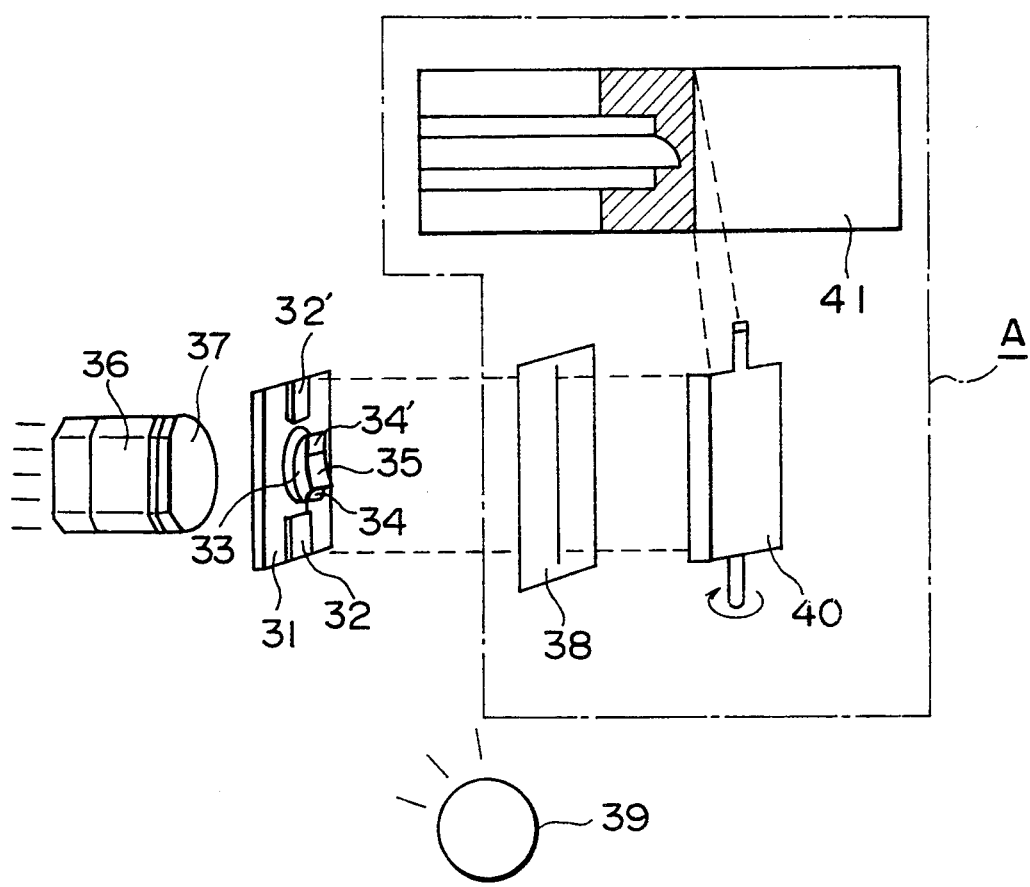
FIG. 3 is a schematic diagram of an inclined mirror method.

According to this measuring method, two plane mirror 32, 32' were mounted on a driver plate 31 whereas an additional plane mirror 34, 34' and an inclined mirror 35 were arranged on the front side of a specimen 33, respectively. When a shock wave from a projectile 36 had reached the back side of the specimen 33 via the driver plate 31 or a free surface of the specimen 31 had been brought into collision against the inclined mirror 35, the mirror-mounted side of the driver plate 31 was shaken so that light reflected by each mirror was disturbed. This was recorded by a high-speed streak camera A through a slit 38. Reference numeral 37 in FIG. 3 represents a flyer plate. A xenon-flash lamp 39 was used as a light source, and a pulse signal from a logic circuit of a speed measuring instrument for the projectile 36 was used as a trigger for the xenon-flash lamp 39. A mirror-rotating type camera was used as the high-speed streak camera A. Reference numerals 40 and 41 represent a rotating mirror and a film, respectively.

Figure 4:
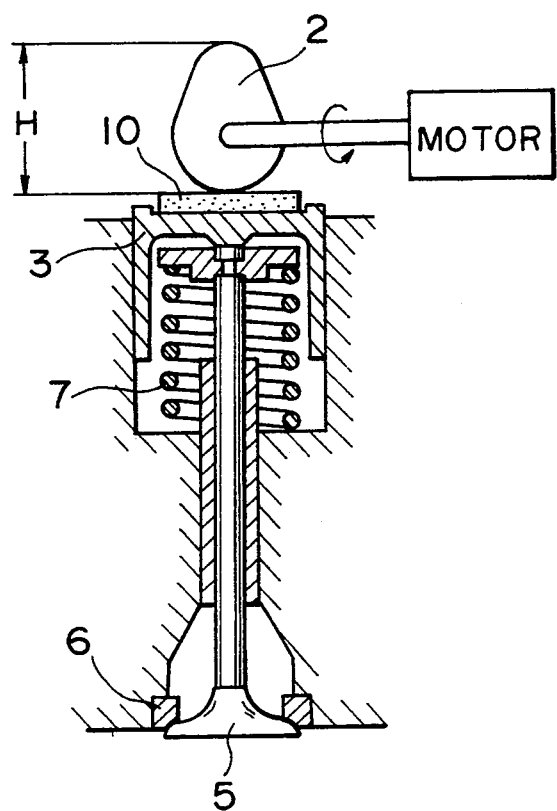
FIG. 4 is a conceptual diagram of a motoring device.

The base material for adjusting shims were evaluated on the basis of the breaking limit number of revolutions per minute thereof with respect to the number of revolutions per minute of engine determined by converting the number of revolutions per minute of cam thereinto in a motoring device shown in FIG. 4. The number of revolutions per minute of engine becomes two times as large as that of cam shaft. The abnormal actions of the valve train in this motoring device starts at 7600 rpm in terms of number of revolutions per minute of engine determined by the mentioned conversion method, and 10000 rpm is the largest number of revolutions per minute of engine. Since this number cannot exceed 9000 rpm in a practical engine even during an abnormal operation thereof, an adjusting shim which is not broken at 9000 rpm becomes a standard adjusting shim to be practically employed. The results of evaluation of these adjusting shim are shown in Table 1. Table 1 also shows the porosity of the base material which was determined on the basis of the values of both the specific gravity of the material calculated on the basis of the composition ratio of additives and the specific gravity of the sintered body calculated according to the Archimedes' law.

TABLE 1

| No. | Porosity (%) | Three-point bending strength (GPa) | Impact compressive elastic limit (GPa) | Number of revolutions (in terms of revolutions of engine) at which adjusting shim was broken (rpm) |
| --- | --- | --- | --- | --- |
| 1 | 1.2 | 1.08 | 15.7 | 9200 |
| 2 | 1.0 | 1.18 | 16.8 | 9800 |
| 3 | 0.6 | 1.20 | 17.6 | >10000 (not broken) |
| 4 | 0.6 | 1.38 | 18.5 | >10000 (not broken) |
| 5 | 0.2 | 1.55 | 21.6 | >10000 (not broken) |
| *6 | 3.5 | 1.02 | 12.2 | 8400 |
| *7 | 3.5 | 0.85 | 10.9 | 7900 |
| *8 | 1.5 | 0.96 | 13.9 | 8500 |

*Comparative examples

EXAMPLE 2

The same raw powder as that used in Example 1 which has the composition shown in Table 2 was mixed, dried and molded by the same methods, and the resultant molded products were sintered in an atmosphere of $N_2$ gas at the temperatures shown in Table 2 and at 2 atm. for 5 hours. The sintered products thus obtained were processed by HIP (hot isostatic pressing) in an atmosphere of $N_2$ gas at 1600° C. and 1000 atm. for 1 hour.

TABLE 2

| No. | Composition (wt. %) | | | | Sintering temperature (°C.) |
| --- | --- | --- | --- | --- | --- |
| | $Y_2O_3$ | $Al_2O_3$ | MgO | $Si_3N_4$ | |
| 9 | 1.0 | 0.5 | 0.5 | Balance | 1600 |
| 10 | 5.0 | 2.0 | 1.0 | Balance | 1600 |
| 11 | 7.5 | 3.0 | 1.0 | Balance | 1600 |
| 12 | 10.0 | 4.0 | 1.0 | Balance | 1600 |
| 13 | 5.0 | 2.0 | — | Balance | 1800 |
| *14 | 15.0 | 6.0 | 1.0 | Balance | 1600 |
| *15 | 0.5 | 0.5 | 0.5 | Balance | 1600 |
| *16 | 5.0 | 2.0 | — | Balance | 1700 |

*Comparative examples

The sintered bodies obtained were evaluated by the same methods as that used in Example 1, and the results are shown in Table 3.

TABLE 3

| No. | Porosity (%) | Three-point bending strength (GPa) | Impact compressive elastic limit (GPa) | Number of revolutions (in terms of revolutions of engine) at which adjusting shim was broken (rpm) |
| --- | --- | --- | --- | --- |
| 9 | 2.0 | 1.04 | 15.2 | 9200 |
| 10 | 0.3 | 1.45 | 20.4 | >10000 (not broken) |
| 11 | 0.4 | 1.38 | 19.7 | >10000 (not broken) |
| 12 | 0.5 | 1.15 | 17.4 | 9750 |
| 13 | 0.3 | 1.25 | 18.1 | >10000 (not broken) |
| *14 | 1.5 | 0.92 | 13.8 | 8300 |
| *15 | 4.2 | 0.74 | 10.2 | 7800 |

TABLE 3-continued

| No. | Porosity (%) | Three-point bending strength (GPa) | Impact compressive elastic limit (GPa) | Number of revolutions (in terms of revolutions of engine) at which adjusting shim was broken (rpm) |
| --- | --- | --- | --- | --- |
| *16 | 4.1 | 0.85 | 11.8 | 8000 |

*Comparative examples

EXAMPLE 3

Adjusting shims numbered 17 to 22 were produced using the sintered body 10 made in Example 2 as the base material. The contact surface of each base material of the shims Nos. 17 to 21 to be brought into contact with a cam was finished with a diamond wheel to 0.2 $\mu$m in ten-point average roughness, and a surface layer having a composition different from that of the base material of each adjusting shim was then formed to a thickness of 0.5 to 50 $\mu$m by one of the methods shown in Table 4. The coating treatment of No. 17 was carried out by coating a silane coupler onto the surface of the base material and heating in the atmospheric at 800° C. for 2 hours. IP (ion plating) of Nos. 18 and 20 was conducted on each base material being heated at a temperature of 400° C., in an atmosphere of gases mixed in molar ratios of $Ar:O_2:N_2=3:1:6$ for No. 18 or $Ar:O_2=9:1$ for No. 20, using Si as a deposition source material. The heat treatment of No. 19 was carried out in the atmospheric at 900° C. for 5 hours. P-CVD (plasma-chemical vapor deposition) of No. 21 was conducted on the base material being heated at 600° C. by feeding source gases of $SiCl_4$ and $CH_4$ in an molar ratio of 1:1 at a pressure of 0.5 torr. The surface layers thus formed on the adjusting shims were subjected to measurement with $\mu$-ESCA, and the weight percentages of silicon, oxygen, nitrogen and carbon in the composition of each of the surface layers are shown in Table 4. The elements excluding these four elements consisted essentially of Y, Al and Mg which were added as the sintering additives.

Each of the adjusting shims thus produced was subjected to 2-hour running-in at 1000 rpm using a lubricating oil in the motoring device of FIG. 4 in which an over head camshaft (OHC) type valve train was reproduced, and thereafter to an operation at 2000 rpm during which the power consumption of the motor was measured, thereby a power loss was determined.

The motoring device was further operated continuously at 2000 rpm for 100 hours, and a difference between the height of the cam recorded before this continuous operation had been started and that thereof recorded after the continuous operated had been completed was determined, whereby a wear loss of the cam was determined. In FIG. 4, "H" represents the height of the cam. A maximum roughness of the surface of each shim which the cam contacted was determined after the completion of the continuous operation. Test results are shown in Table 4 below. Table 4 also shows the test results for an adjusting shim No. 22, which was prepared using the same base material as used in the adjusting shims Nos. 17 to 21 without forming a surface layer, and an adjusting shim No. 23 made of Cr-Mo steel, which is currently used, as comparative examples.

TABLE 4

| No. | Surface layer forming method | Percentages (wt. %) of Si, O, N and C in the composition of surface layer | | | | Power consumption (kW) of motor | Condition of the cam after subjected to endurance test | |
|---|---|---|---|---|---|---|---|---|
| | | Si | O | N | C | | Maximum roughness (μm) of contact surface | Wear loss (μm) |
| 17 | Coating | 21.5 | 32.6 | 43.2 | ** | 0.88 | 0.3 | <1 |
| 18 | IP | 28.9 | 23.8 | 45.1 | ** | 0.88 | 0.3 | <1 |
| 19 | Heat treatment | 43.5 | 49.8 | 4.9 | ** | 0.86 | 0.3 | <1 |
| 20 | IP | 45.4 | 51.3 | ** | ** | 0.89 | 0.3 | <1 |
| *21 | P-CVD | 63.2 | ** | 4.3 | 32.1 | 1.05 | 1.5 | 11 |
| *22 | no surface layer | | | | | 1.11 | 0.5 | 3 |
| *23 | no surface layer | | | | | 1.23 | 0.6 | 5 |

*Comparative examples
Comparative example 23: conventional adjusting shim made of Cr—Mo steel
**not detected

EXAMPLE 4

Adjusting shims numbered 24 to 29 were produced using, as the base material, the sintered body No. 10 made in Example 2. The surface of each base material of these shims to be brought into contact with a cam was finished with a diamond wheel to the roughness shown in Table 5 in ten-point average roughness, and a ceramic surface layer having a composition different from that of the base material of each adjusting shim was then formed to a thickness of 2 μm by the same atmospheric heat treatment as set forth in No. 19 of Example 3. The thus formed surface layer consisted of 44.1 wt. % silicon, 48.6 wt. % oxygen, 5.9 wt. % nitrogen and the balance being yttrium, aluminum and magnesium which were added as sintering additives for silicon nitride. The adjusting shims thus produced were evaluated for their power loss and abrading power by the method identical with that used in Example 3, and the results are shown in Table 5. For comparison, the test results of the conventional adjusting shim produced from the Cr-Mo steel in Example 3 are also shown in the same table.

TABLE 5

| No. | Ten-Point average roughness of contact surface before the formation surface layer (μm) | Power consumption of motor (kW) | Condition of the cam after subjected to endurance test | |
|---|---|---|---|---|
| | | | Maximum roughness of contact surface (μm) | Wear loss (μm) |
| 24 | 0.05 | 0.86 | 0.3 | <1 |
| 25 | 0.1 | 0.87 | 0.3 | <1 |
| 26 | 0.2 | 0.86 | 0.3 | <1 |
| 27 | 0.5 | 0.89 | 0.5 | 3 |
| 28 | 0.8 | 0.90 | 0.5 | 4 |
| 29 | 1.2 | 1.13 | 0.6 | 5 |
| *23 | no surface layer | 1.23 | 0.6 | 5 |

*Comparative example 23: conventional adjusting shim made of Cr—Mo steel

EXAMPLE 5

Adjusting shims numbered 30 to 38 were produced using, as the base material, the sintered body Nos. 1 to 5 and 10 to 13, respectively, made in Examples 1 and 2. Numbers of the base materials shown in Table 6 correspond to those of the sintered bodies prepared in Examples 1 and 2. The surface of each base material to be brought into contact with a cam was finished with a diamond wheel to the roughness shown in Table 6 in ten-point average roughness, and a surface layer having a composition different from that of each base material was then formed to a thickness of 3 μm by the same process as described in No. 17 of Example 3. The thus formed surface layer included silicon, oxygen, nitrogen and carbon in weight percentages as shown in Table 6. The elements other than these four component consisted essentially of Y, Al and Mg which were added as the sintering additives. The adjusting shims thus produced were evaluated by the method identical with that used in Example 3, and the results are shown in Table 6.

TABLE 6

| No. | No. of base material | Ten-Point average roughness of contact surface before the formation of surface layer (μm) | Percentages (wt. %) of Si, O, N and C in the composition of surface layer | | | | Power consumption of motor (kW) | Condition of the cam after subjected to endurance test | |
|---|---|---|---|---|---|---|---|---|---|
| | | | Si | O | N | C | | Maximum roughness of contact surface (μm) | Wear loss (μm) |
| 30 | 1 | 0.2 | 21.4 | 32.5 | 43.7 | ** | 0.87 | 0.1 | <1 |
| 31 | 2 | 0.1 | 23.9 | 38.1 | 36.1 | ** | 0.89 | 0.2 | <1 |
| 32 | 3 | 0.1 | 30.5 | 31.6 | 35.2 | ** | 0.90 | 0.3 | <1 |
| 33 | 4 | 0.05 | 22.7 | 34.9 | 40.4 | ** | 0.87 | 0.1 | <1 |
| 34 | 5 | 0.2 | 25.3 | 34.4 | 36.9 | ** | 0.89 | 0.3 | <1 |
| 35 | 10 | 0.1 | 26.9 | 35.8 | 35.3 | ** | 0.88 | 0.2 | <1 |
| 36 | 11 | 0.1 | 24.6 | 33.6 | 39.6 | ** | 0.88 | 0.1 | <1 |
| 37 | 12 | 0.1 | 27.1 | 37.4 | 32.9 | ** | 0.88 | 0.3 | <1 |
| 38 | 13 | 0.2 | 28.3 | 33.1 | 36.7 | ** | 0.88 | 0.3 | <1 |

**not detected

Figure 5:
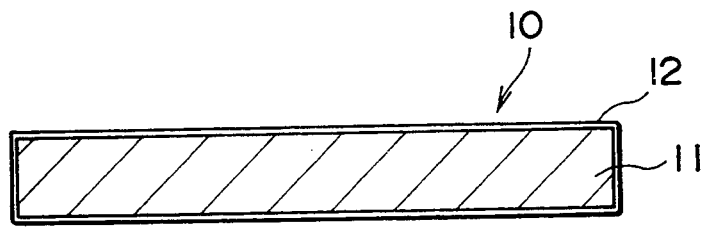
FIG. 5 shows another embodiment of an adjusting shim.

The present invention is not limited to these embodiments. In these embodiments, a heat treatment in the atmospheric, ion-plating, etc., were used for the formation of a surface layer. The obtainment of the same effect can be expected even when a surface layer is formed by some other chemical surface treatment methods, physical surface treatment methods, thermal treatments in various kinds of atmospheres, etc. Even when similar surface layers are formed on the entire surface of the base material 11 as shown in FIG. 5 in order to avoid problems which may arise in assembling adjusting shims, the same effect as mentioned above can be expected and the thus obtained adjusting shims are therefore also included in the claims.

The adjusting shim according to the present invention enables a power loss of a valve train to be minimized, the wear resistance thereof to be improved, and the fuel efficiency, the performance and durability of an internal combustion engine to be improved.

What is claimed is:

1. An adjusting shim produced from a base material consisting of a ceramic, said ceramic containing 80 to 98 wt % of silicon nitride and/or sialon, and having a porosity of no more than 3%, a bending strength of not less than 1.0 GPa, and an impact compressive elastic limit, (Hugoniot elastic limit) of not less than 15 GPa, wherein said base material is provided, on a surface thereof which contacts a cam, with a ceramic surface layer having a composition different from that of said base material, and a hardness lower than that of said base material, said surface layer consisting of a composition containing at least silicon and oxygen, with an oxygen content of 23.8 to 51.3 wt %, based on the total weight of said surface layer, and having a thickness of not more than 50 μm, said base material on which said surface layer has not yet been provided having a ten-point average roughness of not more than 0.2 μm.

* * * * *